(12) United States Patent
Mossi

(10) Patent No.: US 8,858,411 B2
(45) Date of Patent: Oct. 14, 2014

(54) LOADING/UNLOADING SYSTEM SERVING A SHEET CUTTING CENTRE, FEEDING TRAY THEREFOR AND RELATIVE HANDLING METHOD

(75) Inventor: James Mossi, Uggiate Trevano (IT)

(73) Assignee: Travers International, S.A., Panama (PA)

( * ) Notice: Subject to any disclaimer, the term of this patent is extended or adjusted under 35 U.S.C. 154(b) by 1342 days.

(21) Appl. No.: 12/599,850

(22) PCT Filed: May 9, 2008

(86) PCT No.: PCT/IB2008/051866
§ 371 (c)(1), (2), (4) Date: Apr. 13, 2010

(87) PCT Pub. No.: WO2008/139409
PCT Pub. Date: Nov. 20, 2008

(65) Prior Publication Data
US 2010/0296905 A1 Nov. 25, 2010

(30) Foreign Application Priority Data
May 11, 2007 (IT) .............. MI2007A0968

(51) Int. Cl.
| | |
|---|---|
| *B23Q 7/04* | (2006.01) |
| *B21D 43/28* | (2006.01) |
| *B21D 43/11* | (2006.01) |
| *B21D 43/10* | (2006.01) |
| *B23K 26/38* | (2014.01) |
| *B23K 37/04* | (2006.01) |
| *B65G 47/91* | (2006.01) |
| *B65G 47/92* | (2006.01) |

(52) U.S. Cl.
CPC .............. *B21D 43/28* (2013.01); *B21D 43/11* (2013.01); *B21D 43/105* (2013.01); *B23K 26/38* (2013.01); *B23K 37/0408* (2013.01); *B23K 2201/18* (2013.01); *B65G 47/912* (2013.01); *B65G 47/92* (2013.01)

USPC ................ 483/15; 483/14; 483/32; 414/591; 414/751.1; 414/752.1; 414/806; 198/468.4; 198/468.5

(58) Field of Classification Search
CPC ............ B65H 1/00; B65H 1/02; B21D 43/20; B21D 43/28; B21D 43/105; B65G 47/912; B65G 47/92
USPC ............ 414/19, 222.02, 222.12, 226.01, 591, 414/752.2, 806; 198/468.4, 468.5; 483/14, 483/32
See application file for complete search history.

(56) References Cited

U.S. PATENT DOCUMENTS 4,145,802 A * 3/1979 d'Auria ........................... 483/32
5,036,736 A 8/1991 Hillock et al.
(Continued)

FOREIGN PATENT DOCUMENTS

EP 0483652 A 5/1992

OTHER PUBLICATIONS

International Search Report in Corresponding Application PCT/IB2008/051866 Feb. 23, 2009.

*Primary Examiner* — Scott Lowe
(74) *Attorney, Agent, or Firm* — Young & Thompson

(57) ABSTRACT

A system for loading/unloading sheets is disclosed, some of which also being of metal, and handling method thereof, serving a laser cutting center. The system includes a pair of rails (1, 2), supported at a preset height above a feeding tray (T) of the cutting center, whereon at least one Cartesian robotized hand is movably mounted, capable of moving along horizontal axes X and Y as well as along a vertical axis Z, mutually orthogonal, and including at least two bridge cranes (3, 4) sliding along the rails (1, 2) each of which supports at least one pair of robotized hands (5-8), and the robotized hands (5-8) have an electromagnetic pick-up head which may be coupled with a suction-cup device (103). Feeding tray (T) consists of bars whereon small tesserae (204) of ceramic material are fitted.

21 Claims, 8 Drawing Sheets

(56) References Cited

U.S. PATENT DOCUMENTS

| | | | |
|---|---|---|---|
| 5,103,965 A | * 4/1992 | Takahashi et al. | 198/468.4 |
| 5,481,083 A | 1/1996 | Smyth, Jr. | |
| 6,835,040 B2 | * 12/2004 | Quiring | 414/281 |
| 2003/0147729 A1 | 8/2003 | Leibinger et al. | |

* cited by examiner

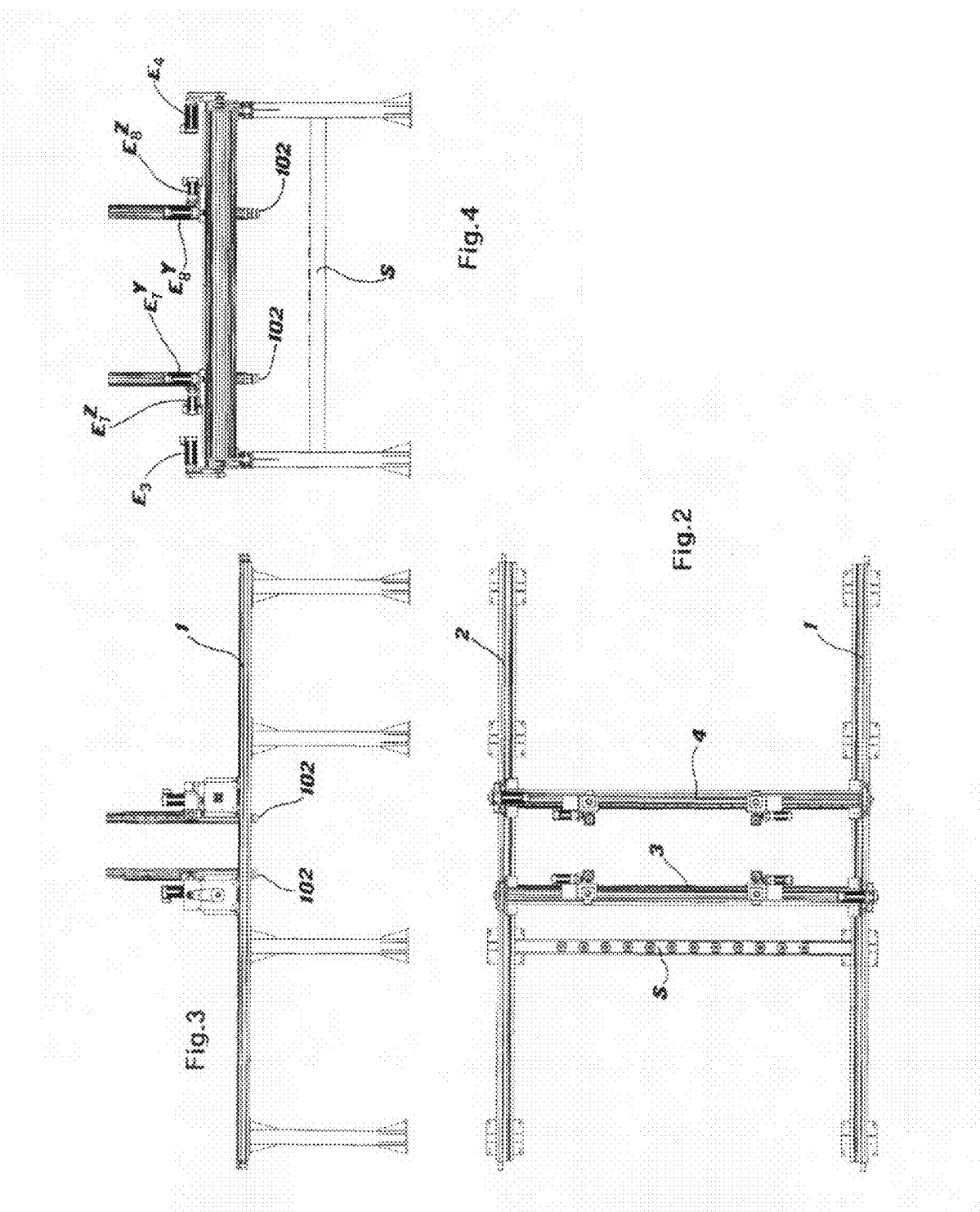

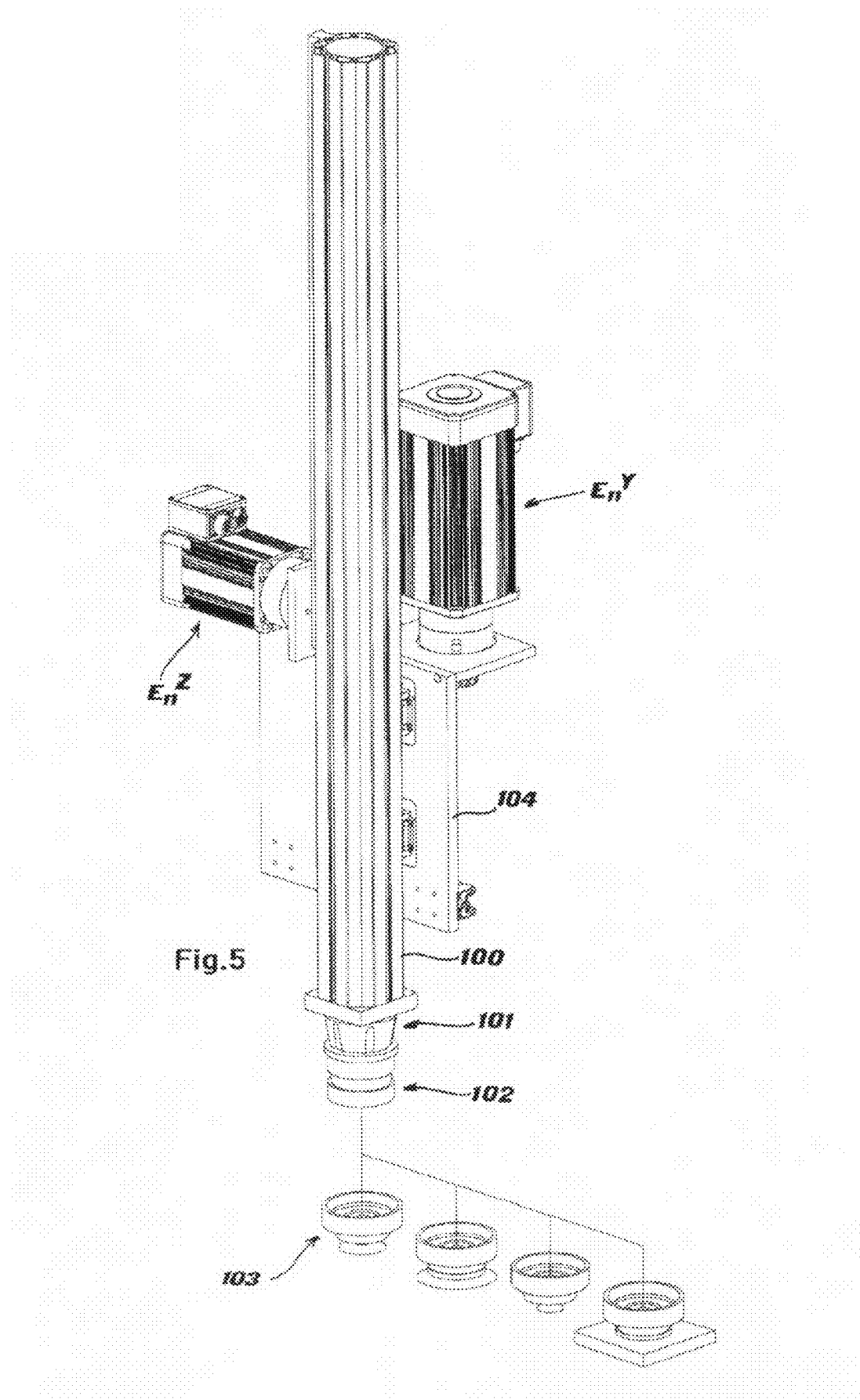

LOADING/UNLOADING SYSTEM SERVING A SHEET CUTTING CENTRE, FEEDING TRAY THEREFOR AND RELATIVE HANDLING METHOD

FIELD OF THE INVENTION

The present invention concerns a loading/unloading system for a cutting centre, in particular a system of the type employing Cartesian mechanical hands.

BACKGROUND

As known, metal sheet and panel cutting centres are systems intended for cutting planar surfaces, having sometimes a very complex perimeter, starting from a typically rectangular sheet (for example measuring 1500×3000 mm with a thickness ranging from 0.5 to 20 mm). The cut is performed employing various techniques, also based on the composition of the sheet material: for example, there are machines employing laser cutting, oxygen lance cutting, water-jet cutting, plasma cutting and so forth.

A particular sector is that of metal sheet cutting, which is typically performed employing laser devices.

In this sector, in the loading and unloading phase to and from the cutting centre, there is the need to handle sheets of a non-negligible weight. Typically, sheets are stored in a warehouse, where they are stacked, for example according to even thicknesses, wherefrom they must be taken and laid into a collection point in the order in which they must be used (hence also with different thicknesses). From the collecting point, the loading/unloading system must individually take the virgin sheets and lay them onto the movable tray of the cutting centre. Once the cutting is complete, the loading/unloading system must again take the cut pieces and forward them to unloading and palletising.

The peculiarity of this process lies in the fact that the virgin sheet and the cut pieces are very different products and hence require a lifting and handling system which is capable of handling at the same time two rather different work conditions.

Moreover, the cut pieces are rarely repetitive in size and arrangement between one sheet and the next.

In order to meet these requirements, it is possible to use two different techniques. The most commonly used technique provides to arrange a bridge-like castle framework, opposite the cutting centre, whereon both a raiser with suction-cup gripper—which is intended to handle the virgin sheet—and a forklift—which is intended to take the cut-in sheet and to transfer it into the unloading station—are translatable. An example of such system is the ACS model available from Antil SpA.

This solution is very popular, also due to its simplicity and ease of control, but it implies some drawbacks. The main problem is due to the fact that the cut-in sheet cannot be fully disassembled into individual components, otherwise the forklift might not operate correctly. This implies that the cutting programme does not complete any of the cuts of the individual pieces, but always leaves one or more small connecting bridges having a common frame (which then makes up work off-cuts). Therefore, once the cut-in sheet has been unloaded, it is necessary to break these small connecting bridges to free the individual pieces from the off-cuts: this task is traditionally performed by hand, with the imaginable consequences in terms of cost and performance time.

Moreover, it is necessary that the suction loading system consists of a large number of small vacuum cups, otherwise it would be unable to impart an adequate force for lifting the weight of thick metal sheets.

A second technology which may be employed in a loading/unloading system is that of Cartesian mechanical hands, which is traditionally used also in a number of other similar sectors.

A Cartesian robotized hand typically consists of a retaining member, for example a vacuum cup, mounted at the end of a support mounted movable on a pair of bridge cranes: by suitably controlling driving motors, it is possible to move and position the retaining member into a desired point X, Y of the plane.

In the cases in which the retaining member is also vertically translatable on the movable support, it is possible to obtain the desired positioning along the Z axis, thereby achieving an overall positioning in the Cartesian space X, Y, Z.

A suitably-sized and suitably-configured Cartesian mechanical hand is hence suited to the handling of sheets also. The advantage of a suitably controlled mechanical hand is that of being able to perform a simple, repetitive translating movement, useful for the loading of a virgin sheet, but also of performing more complex movements, such as the identification of a single workpiece cut out from the sheet, the lifting thereof and the transfer thereof into a desired unloading position.

For transferring a large and heavy object, such as a metal sheet, it is also widely known to resort to the coordinated (i.e. synchronous) movement of two or more Cartesian mechanical hands, so that it is not necessary to use a single, very sturdy mechanical hand which must necessarily act in the centre of gravity of the object.

As can be guessed, resorting to Cartesian mechanical hands makes the system more flexible, even though it causes more problems in terms of tuning.

In particular, the workpieces may be completely cut and separated from the cut-off structure, because they are then taken individually by the mechanical hands and orderly stacked in the unloading station, which makes useless the subsequent manual separation action. Again, as known, such a system is by its nature suited to operate unmanned continuously for many hours.

The present invention fits in this sector.

In particular, the object of the invention is that of providing a loading/unloading system with Cartesian mechanical hands which is particularly efficient and suited to meet the peculiar requirements in the handling of metal sheets serving cutting centres.

As a matter of fact, in this field, as well as in similar fields, the handling system normally provides a single bridge crane whereon a single Cartesian mechanical hand is supported translatable, or a pair of mechanical hands, equipped with suction-cup ends: this configuration is not fully satisfactory for transferring large and heavy workpieces, such as full virgin metal sheets or cut-off structures, or to have a good unloading productivity of the cut workpieces. Furthermore, when it is necessary to exploit simultaneously both mechanical hands for lifting a large piece, it is no longer possible to change the orientation thereof in the plane, because the pair of mechanical hands remains necessarily aligned on the same bridge crane.

Moreover, the suction-cup gripping elements are unable, individually, to lift heavy loads: it is hence necessary to make a compromise choice between a large number of suction cups—which, however, increases the bulk of the gripping head of the hand—and a small number of suction cups, which, however are unable to lift heavy pieces. It must furthermore be noted that the unloading of the cut-off structure is critical, because it does not offer a surface wide enough to allow the suction cups to operate correctly: there is hence a significant limit to said structure weight.

Finally, there is a problem connected with the feeding tray of the handling centre: as a matter of fact, it should be made of sturdy metal materials, to meet the requirements related to the handling apparatus, but at the same time it is intended to interact with the laser cutting machine within which it might undergo accidental welding to the sheets to be cut.

Therefore, the Applicant set himself the object of solving these drawbacks of the known art.

SUMMARY OF THE INVENTION

Such object, according to the invention, is achieved by means of a system as described in its essential features in the attached main claim.

In particular, according to a first aspect of the invention, a sheet loading/unloading system is provided, part of which also made of metal, serving a cutting centre, of the type comprising a pair of rails, supported at a preset height above a feeding tray of the cutting centre, whereon there is movably mounted at least one Cartesian mechanical hand capable of moving along horizontal axes X and Y as well as a vertical axis Z, which are mutually orthogonal, and further comprising also at least two bridge cranes sliding on said rails, each of which supports at least one pair of mechanical hands, said hands having an electro-magnetic pick-up head apt to be coupled with a suction-cup device.

According to a preferred aspect, in the system a tool replacement station is further provided, wherein a variety of interchangeable suction-cup devices may be housed.

According to a further aspect, the robotized hands comprise an elongated prismatic body mounted translatable along said vertical axis Z on saddle means, said saddle means in turn being mounted translatable along said horizontal Y axis on one of said bridge cranes.

According to another preferred aspect, the robotized hands further comprise, in the lower portion, a vertical-axis electric motor, and the electro-magnetic pick-up head is integral with said motor shaft. The electro-magnetic pick-up head has a central hole in correspondence of the shaft, which is hollow and connected to a vacuum pipe. The vertical-axis motor is preferably a torque motor and sliding contacts are provided for the transfer of electric current to a movable part of the motor.

According to a further aspect, the suction-cup device comprises a housing head of ferro-magnetic material which supports one or more suction cups in fluid connection with a central fitting capable of arranging itself in correspondence of the central hole of the gripping head.

According to another aspect of the invention, a system is further provided wherein the feeding tray comprises a series of equally-distanced parallel bars whereon a plurality of small ceramic tesserae is fitted. Said tesserae are substantially square-shaped with pairs of opposite vertexes parallel and orthogonal to the bar axis, respectively.

BRIEF DESCRIPTION OF THE DRAWINGS

Further features and advantages of the system and of the method according to the invention will in any case be more evident from the following detailed description of a preferred embodiment of the same, given by way of example and illustrated in the accompanying drawings, wherein:

FIGS. 2-4 are top plan, side elevation and front elevation views, respectively, of the system of FIG. 1;

FIG. 5 is a side elevation view of a robotized hand according to the invention;

FIG. 7A is an enlarged view of circle A indicated in FIG. 7;

DESCRIPTION OF THE PREFERRED EMBODIMENTS

Figure 1:
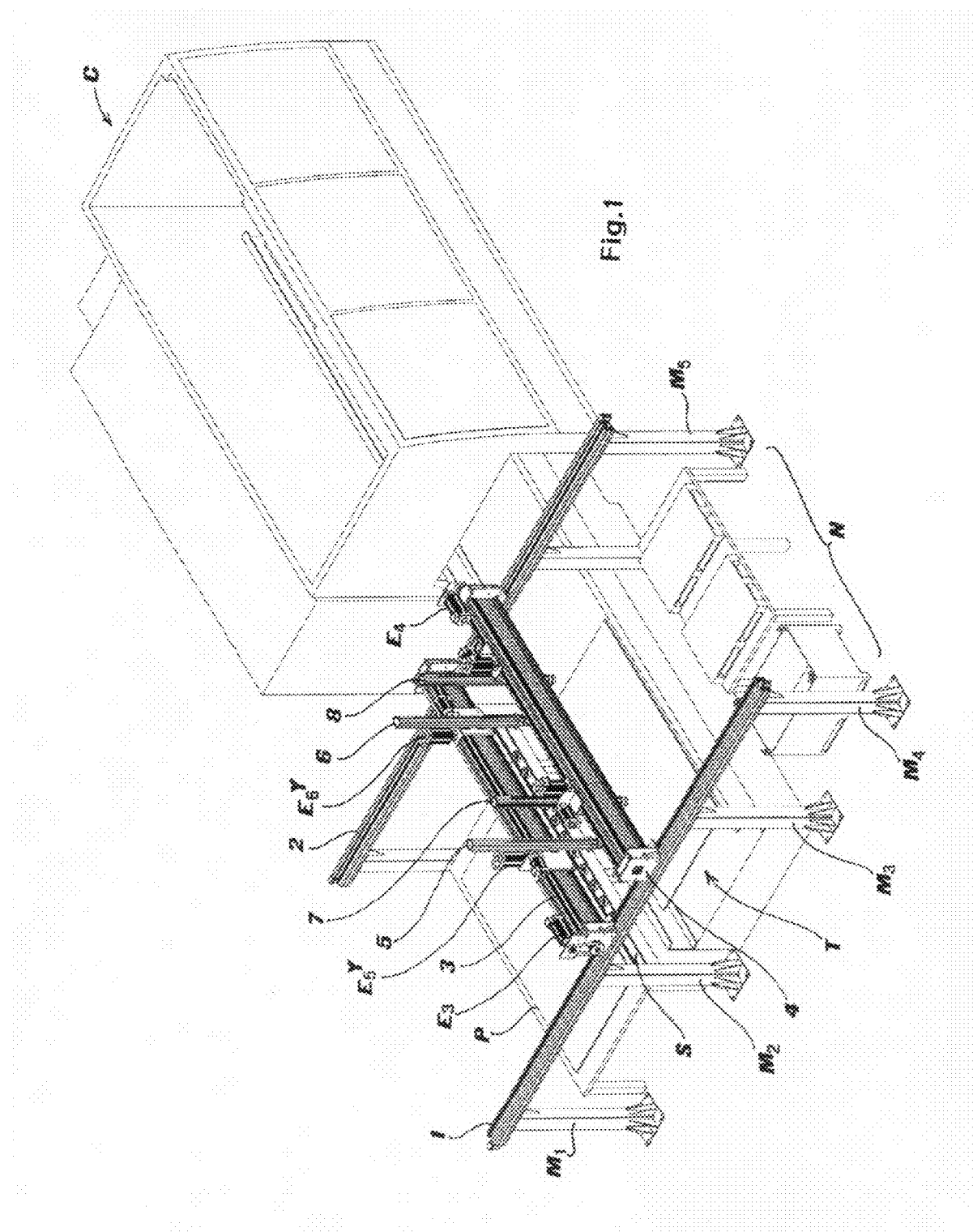
FIG. 1 is a perspective view of the system of the invention laid close to a cutting centre.

FIG. 1 schematically shows a cutting centre C provided with a conventional feeding tray T, whereon the virgin sheet and the cut-in sheet are supported for the introduction into and removal from cutting centre C.

Across feeding tray T, in a way conventional per se, two sliding rails 1 and 2 are provided, supported at the desired height by respective posts M1-Mn.

According to the invention, sliding rails 1 and 2 support a pair of sliding bridge cranes 3 and 4, each in turn being provided with a transversal sliding guide for a pair of robotized hands, 5, 6 and 7, 8, respectively.

For the movement on rails 1 and 2, each of bridge cranes 3 and 4 is provided, in a way known per se, with an electric handling motor (X axis), E3 and E4, respectively.

Each robotized hand 5-8 is configured so as to be able to translate on its own bridge crane, but also to translate vertically for lowering or raising a pick-up head arranged at the lower end.

For such purpose, electric motors are provided for the horizontal movement (Y axis) $E_{5Y}$-$E_{8Y}$ and for the vertical movement (Z axis) $E_{5Z}$-$E_{8Z}$.

Moreover, each pick-up head is mounted rotating about a vertical axis (J axis) at the lower end of the robotized hand. For such purpose, each robotized hand consists of an elongated, prismatic support body 100 (the so-called "candle") at whose lower end there is installed a vertical-axis motor 101 which supports a pick-up head 102.

In detail the following movements are allowed:
  2 X axes, with sphere or roller recirculation guides, whose movement is allowed by a double rack-and-pinion mechanism to guarantee the perfect parallelism during movement; motorisation preferably occurs by means of a brushless motor reducer controlled by the corresponding actuation; the position is controlled by suitable reading means, for example by means of a magnetic line and a contactless sensor;
  4 Y axes, positioned pairwise along the edge of the X axis, having sphere recirculation guides and provided with a rack-and-pinion handling mechanism; motorisation occurs by means of a brushless motor reducer controlled by the corresponding actuation; the position is controlled by suitable reading means, for example by means of a magnetic line and a contactless sensor;

4 Z axes, each positioned on-board of the Y axis, which have sphere recirculation guides and are provided with rack-and-pinion movement mechanism; motorisation preferably occurs by means of a brushless motor reducer controlled by the corresponding actuation; the position is controlled by suitable reading means, for example by means of a magnetic line and a contactless sensor;

4 J axes, each positioned on-board of the Z axis, which allow the slewing of the individual workpiece.

The above-described axes are controlled by a multi-axis motion supervisor which operates in a communication network with the digital servocontrols. With this configuration it is possible to accomplish distributed-control applications, for the purpose of obtaining interpolated or synchronised or fully unrestrained movements, but always keeping under control the respective positions.

Figure 6:
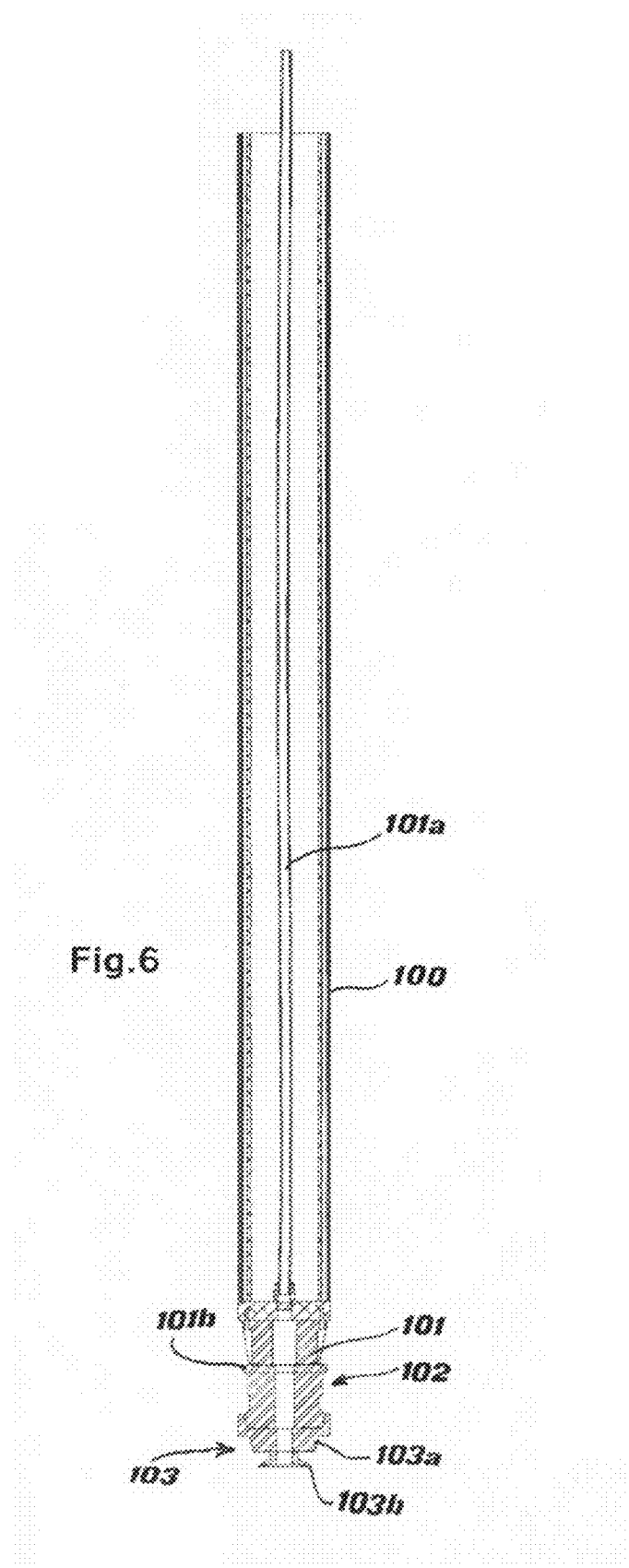
FIG. 6 is a longitudinal section view of the robotized hand of FIG. 5.

According to an advantageous feature of the invention, the pick-up head of each robotized hand comprises an electro-magnetic device 102, made integral with the control shaft of the vertical-axis motor 101 (FIG. 6). The electro-magnetic device is sized so that the simultaneous action of the four robotized hands allows to impart a force adequate to the lifting of the heaviest considered sheet. Thereby it is possible, with the same four mechanical hands, to provide both to the loading of the virgin sheet and, after the cutting, to the unloading of the individual cut pieces, including the cut-off frame.

According to the invention, the electro-magnetic device may be used as such or it may be coupled with a suction-cup assembly 103 (FIG. 5 shows four exemplifying types thereof, with variously-sized suction cups).

Figure 10:
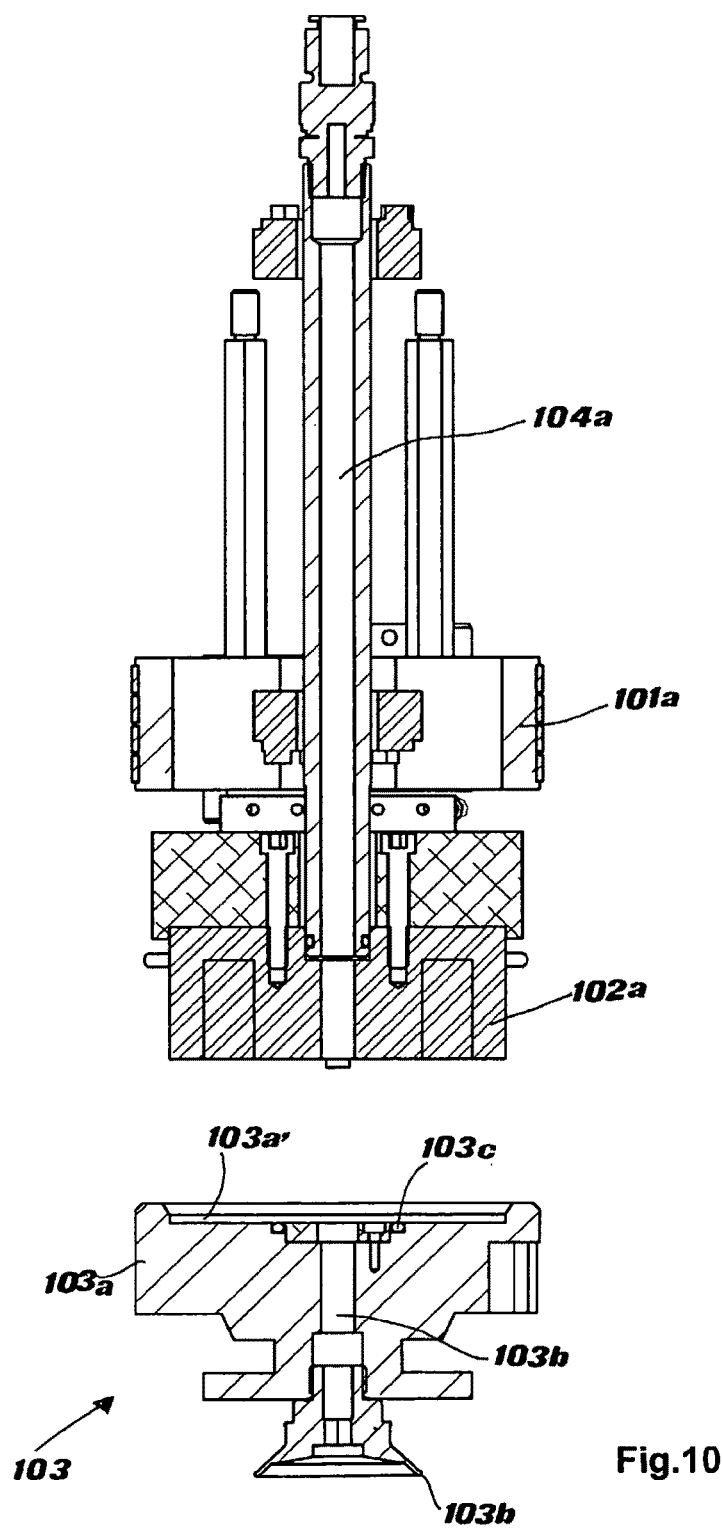
FIG. 10 is a longitudinal section view with parts removed of a robotized hand according to the invention adjacent to a suction-cup device.

FIG. 10 shows in detail a robotized hand, from which the candle body has been substantially removed.

In the lower portion of head 102 a rotary manifold 101a and an underlying electro-magnet 102° are found; both are crossed by a longitudinal channel which, above the electro-magnet body 102a, takes on the shape of a vacuum pipe 100a.

In the lower part of electro-magnetic body 102a suction-cup device 103 may be coupled. Said device has in its top part a circular recess 103a', intended to snugly fit in the lower surface of electro-magnetic body 102a. Along the central axis of the body 103a of the suction-cup device 103 a vacuum channel 103b is provided. In the area surrounding this vacuum channel 103b, at the mouth on the recess surface 103a', a gasket 103c, such as an O-ring, is provided, intended to establish a sealing between device 103 and electro-magnet 102a.

In substance, the head of the robotized hand may change the nature of the end pick-up tool according to the specific requirements which are detected during operation of the system.

For such purpose, according to the embodiment illustrated in the drawings, next to the feeding tray there is provided a tool change station S, where a series of variously-sized and variously-shaped suction-cup devices 103 may be housed. These devices are housed in suitable seats, ready to be taken as needed by the electro-magnetic device of the individual robotized hands.

This station S may be provided also in other positions, provided they may be automatically reached by all the robotized hands of the system.

FIGS. 5-6 show in detail one of the four robotized hands installed on the system according to the invention.

It must be underlined that the electro-magnetic pick-up head consists of a cylindrical body 102 integral with a rotary part 101b del of electric motor 101 mounted at the lower end of hollow candle 100.

Electric motor 101, in terms of capability to bear loads and of control precision, is preferably a servomotor of the "torque" type.

Motor 101 has sliding conducive contacts (not shown) capable of transferring electric current from fixed conductors (which also run within candle 100) to the movable part of the motor.

The section of candle 100 is in turn slidingly supported vertically along the Z axis on a saddle 104, in turn mounted sliding along the horizontal Y axis on the guide integral with the respective bridge crane. FIG. 5 shows clearly the two motors, intended for the two translations along the Y axis and the Z axis, $E_n^Y$ e $E_n^z$, respectively.

Advantageously, the central shaft of torque motor 101 is hollow and ends in a corresponding central hole of cylindrical body 102. Above, the hollow shaft of torque motor 101 is connected to a vacuum pipe 101a which runs along section 100, coming out of the open top end. Along vacuum pipe 101a a pipe fitting with rotary connection is provided, so that the axis of motor 101 and the cylindrical magnetic body 102 integral therewith may rotate freely without the pipe kinking.

Preferably, suction-pad assembly 103 consists of a housing-shaped support of ferromagnetic material 103a, intended to couple with electro-magnetic device 101, with which one or more suction-cup elements 103b are made integral. Also, housing-shaped support 103a comprises a central hole suitable to be registered according to the hole of cylindrical body 102, preferably provided with sealing elements. The suction-cup elements are connected to such central hole, so that a fluid communication may be established between the suction cups and the vacuum pipe and hence the sucking operation of the suction cups may be allowed.

The choice to use exclusively the magnetic head, or the magnetic head coupled with vacuum suction assembly 103, may depend on various factors and may also meet user preferences, but it certainly makes the system operation more flexible, together with the fact that the provision of two bridge cranes makes four pick-up points available which may be scattered across a plane.

In particular, with the electro-magnetic pick-up heads, it is possible to impart a remarkable lifting effort, for example up to 300 kg for each robotized hand, for a total of up to 1,200 Kg. This condition is favourable for lifting and loading virgin metal sheets of large thickness.

At the same time, the magnetic pick-up heads are sufficiently small to be able to grip tightly the cut out pieces from the feeding tray and to transfer them to the unloading station.

When mutually stacked instead, thin ferrous sheets (for example thinner than 2 mm) must be taken for transferring them to the feeding tray, the electro-magnetic head might turn out to be unusable, because the effect of the magnetic field would end up affecting also the stacked sheets underneath the first one, determining incorrect drawing (multiple sheets would be lifted simultaneously). In this case, the robotized hands are provided with suction-cup devices (in a number and arrangement suited to the sheet size and weight) which are capable of reliably taking a single sheet from the stack.

Also, in any other circumstance in which the cutting centre must temporarily operate with sheets of non-ferro-magnetic material, it is provided that the four heads of the mechanical hands are equipped with a suitable suction-cup device.

For example, suction cups measuring ø152 mm may initially be used which, at −60 kpa, are capable of lifting a weight of 85 Kg each (for a total of 340 Kg), sufficient for sheets made of stainless steel or Fe measuring 1,500×3,000 and with a thickness of 8 mm (weight of about 280 Kg).

During cutting, the robotized hands can return to the tool change station S and replace those suction cups with other, smaller ones, for example measuring ø77 mm, useful for the cycles picking-up and laying special individual sheets weighing up to 20 Kg.

Operationally, the system shown in the drawings works in the way described below.

A series of virgin sheets are unloaded—automatically or by a manual-control hoister—from a storehouse and stacked onto a loading platform P, said sheets possibly having different thicknesses and sizes, in the order provided by the work cycle of the cutting centre. Based on the nature and size of the load to be handled it is determined if simply the magnetic pick-up head or a suction cup and the relative diameter are necessary. The robotized hands are moved in correspondence of the tool change station S and take, if necessary, the desired suction-cup device, depending on the material and on the thickness of the virgin sheet to be taken. After that, the four robotized hands are synchronised, suitably acting on the respective electric axes of all the driving motors, so as to set up the entire handling assembly as if it was a rigid system. The four robotized hands are moved above loading platform P and the pick-up heads are made to descend onto the sheet until they adhere steadily therewith. At this point the sheet may be lifted, translated and then laid onto feeding tray T of the cutting centre.

The sheet is introduced into the cutting centre, while another empty loading tray is taken out and brought in correspondence of station T. The four robotized hands thereby move to take a fresh sheet which immediately afterwards is laid onto the empty tray. Upon the subsequent change of the two trays of the cutting centre, the previous sheet, by now fully cut, lies below the robotized hands. In the meantime the system management programme has acquired the configuration and the arrangement of the expected cut pieces (which configuration may vary continuously, from one sheet to the next, based on what has been established by the cutting programme, optimised with "nesting" techniques which generate a possibly high variability in the presentation of the cut pieces), it has activated and/or deactivated the magnetic field of the pick-up heads, to provide or to free the suitable suction-cup devices, and it has hence arranged the robotized hands in the most suitable position.

Due to the opportunity to control independently the movement of the pick-up heads along the three Cartesian axes (the X axis with the movement of the bridge cranes on rails 1 and 2, the Y axis with the movement of the robotized hands along the respective bridge crane, and the Z axis with the vertical movement of the robotized hands on respective saddles 104) it is possible to position the pick-up heads in the desired locations, following the most suitable path based on the established requirements.

As soon as the cut sheet comes out of the cutting centre on feeding tray T, the four robotized hands are made to descend to take the first pieces and later they are controlled so as to transfer all the pieces, and unloading them, in an orderly way onto collection boxes or pallets in unloading station N.

Since the pick-up heads are mounted axially rotatable on respective motors 101, it is possible to orient the pieces as desired during the transfer to the unloading station. Even in case it is necessary to retain a piece by means of two pick-up heads, it is possible to change the orientation thereof in the plane by resorting to mutual displacement along axes X and Y of two heads belonging to two different bridge cranes.

Once all the pieces cut off a single sheet have been unloaded, the robotized hands are used again to take the scrap skeleton which, for ease of management, may itself be cut (in cutting centre C) into multiple, small-sized pieces, so as to be able to lay it more easily into a suitable area devoted to scraps, for example a metal skip box.

Should it be considered suitable, it is possible to provide—through an adequate configuration of the "nesting" programme of the cutting centre—that suitably-sized and suitably-located areas are left in the skeleton: this improves skeleton gripping by the pick-up heads.

All the functional management of the robotized hands is performed by a software implemented in a coordinating and control centre of the driving motors.

Some peculiar features of such software are the following ones:

it supplies the operator with a quick and agile machine programming system;

it supplies the interface between the files intended for the cutting centre and the controls for the mechanical pick-up hands;

it identifies and optimises pick-up modes of virgin sheets and of the cut pieces and the subsequent release into the unloading warehouse.

In particular, it is capable of importing the configuration of the cut pieces directly from the files (for example in DXF or DWG format) supplied to the cutting machine; based on this configuration, it identifies the cut shapes and defines the centres of gravity thereof, for establishing the pick-up points (where to cause the magnetic head or the suction-cup device to adhere) to take the individual pieces and how to possibly rotate the pieces for the subsequent release into the unloading/palletising warehouse; the graphic definition (through the supplied dxf/dwg file) of such positions and rotations occurs either fully automatically (according to criteria defined in advance) or in a simple way for the operator, for example by offering a plurality of choices which may be selected by pointing on the screen by way of a mouse or by touchscreen.

The field of geometries and the dimensional range of the cut shapes do not have particular restrictions, provided they have a continuous surface with a size at least equal to that of the pick-up tool.

The software is capable of virtually managing a flexible 4-point pick-up device, to be used in any one of the standard configurations:

4 pick-up points on a single piece (typically the load of the full sheet to be processed).

2 pick-up points on a single piece.

1 pick-up point, simultaneously picking up two pieces.

The control of the four pick-up points/robotized hands further guarantees that there is no collision between the axes even when the piece is on board: in substance, the increased bulk of each axis according to the profile of the loaded piece is taken into account.

The control software furthermore manages the machine features parameterwise (for example definition of zeros, definition of min./max. travel of the axes, inhibition of the axes, . . . ) and manages the "out-of-layout" movement (i.e. outside a preset work area) in a condition of non-use of the pick-up and release devices.

In the following, criteria used by the control software for managing peculiar operation conditions are reported as an example.

If the centre of gravity of the pieces lies outside the drawing profile, the choice of how to pick-up the piece is delegated to the operator; the number of axes to be used for picking up the piece automatically depends on the length/width ratio of the same.

Should the piece weight (calculated by means of supplied table data) exceed the useful load of the pick-up tool or tools which are assigned based on the graphic calculation, if possible a further pick-up axis is allocated in addition to the one provided by the theoretical calculation. In this case the system may be set up to apply again an automatic algorithm to reposition all the axes (including the added one) or to give the operator the opportunity to choose the pick-up points. For example, in the pick-up definition, the system automatically suggests, based on the shape and weight of the various details, a first pick-up condition—determined by preset rules (which rules may be subsequently extended or improved)—then supplies a second tuning condition, which may be performed manually by the operator by moving with the mouse and/or through the keyboard the pick-up positions which are visible on a screen of a control panel. The first choice occurs in an automatic manner, the operator indicates to the system which rule to adopt or the system is capable of applying the rule based on the shape. The system suggests the adopted solution graphically highlighting the pick-up points and the operator can validate such positions or act manually by pointing with the mouse on the candle to be moved and by dragging it into the preferred position, or by introducing from the keyboard incremental coordinates in terms of ΔX and ΔY. The above operations always occur in an interactive way with graphic highlighting of the final result.

Figure 7:
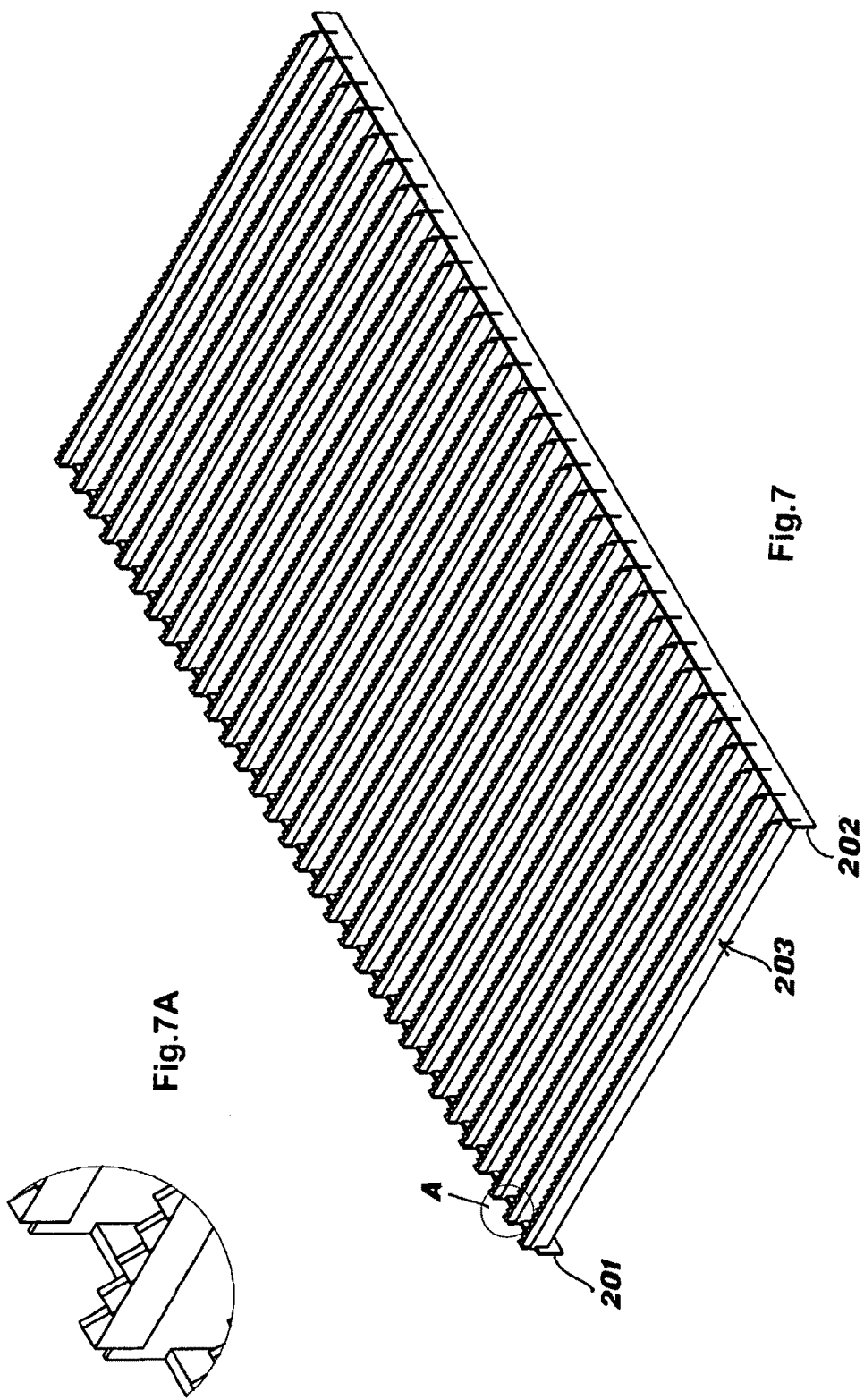
FIG. 7 is a perspective view of a feeding tray according to the invention.

Due to the high control granularity of all the pick-up points, it is possible to release and take the sheets from the feeding tray in an extremely gentle way without causing shocks and impacts. This work condition of the system according to the invention paves the way to a further advantageous implementation, which concerns precisely the feeding tray. As a matter of fact, according to the invention, the feeding tray is preferably built as shown in FIG. 7: it comprises a pair of support crossmembers 201 and 202 between which a plurality of parallel bars 203 arranged at a short distance from one another extend.

The bars have a squashed rectangular section (as clearly shown in FIG. 8) and are mounted edgewise on crossmembers 201 and 202. Each bar 203 along the top edge has a groove or pocket 203a within which there are housed a plurality of small tesserae of ceramic material 204. In particular, the small ceramic tesserae 204 are substantially square-shaped and are mounted on bars 203 so that the two opposite vertex pairs are aligned according to the axes parallel (a-a') and transversal to bar 203, respectively.

The small tesserae 204 are, for example, of the type employed for the cladding of high-temperature kilns, obtained by alumina sintering.

Figure 8:
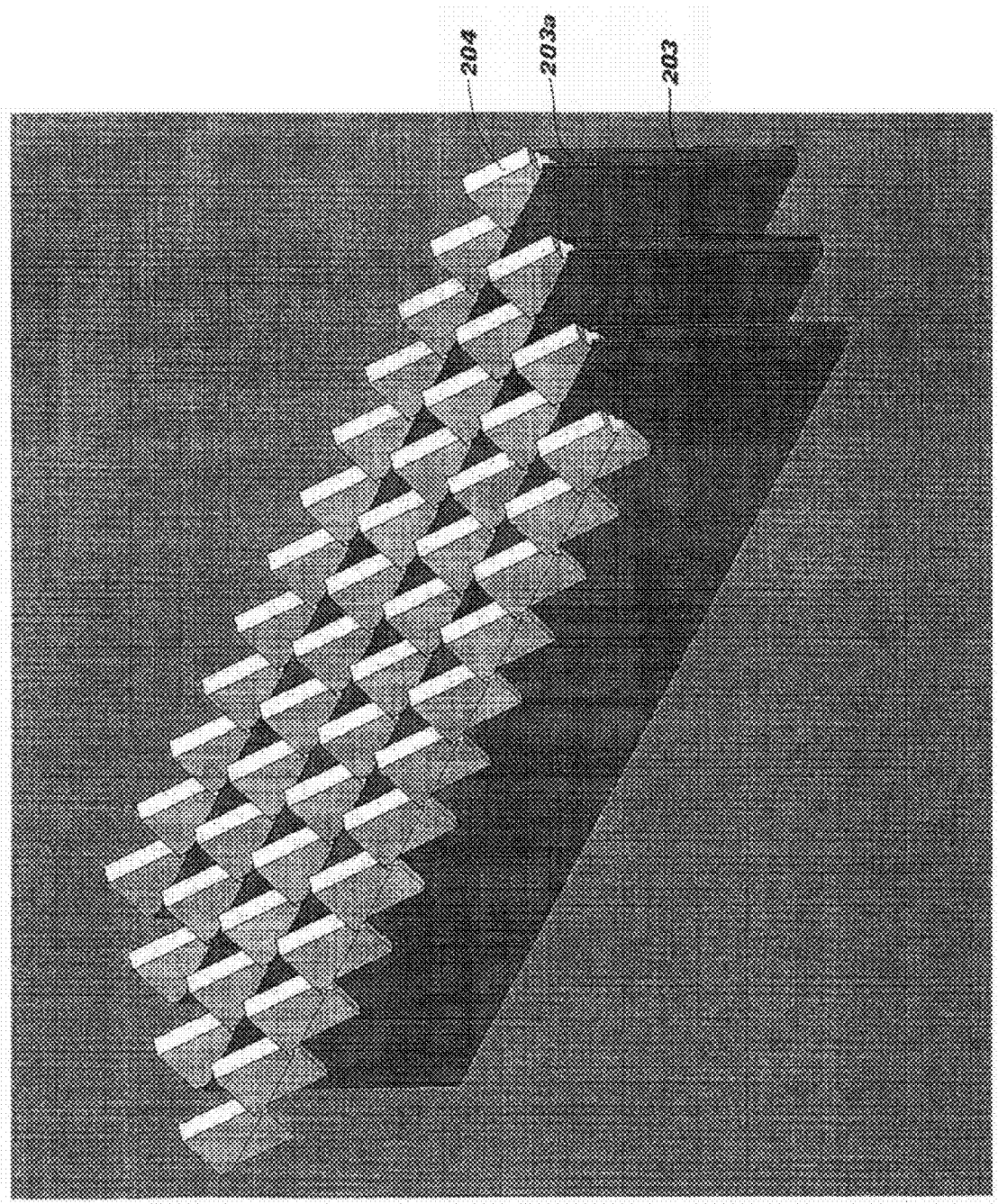
FIG. 8 is a depictive perspective view of some bars and of an isolated array of the small tesserae making up the tray of FIG. 7.
Figure 9B:
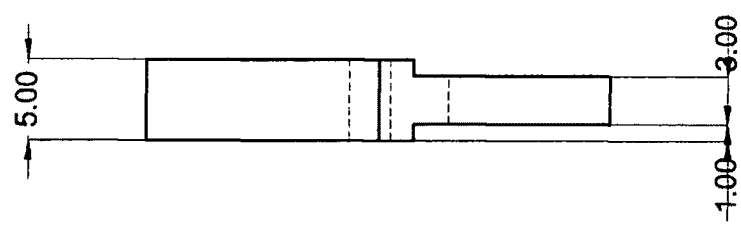
FIGS. 9A and 9B are side elevation and front elevation views, respectively, of a small example tessera for the bars of FIG. 8.
Figure 9A:
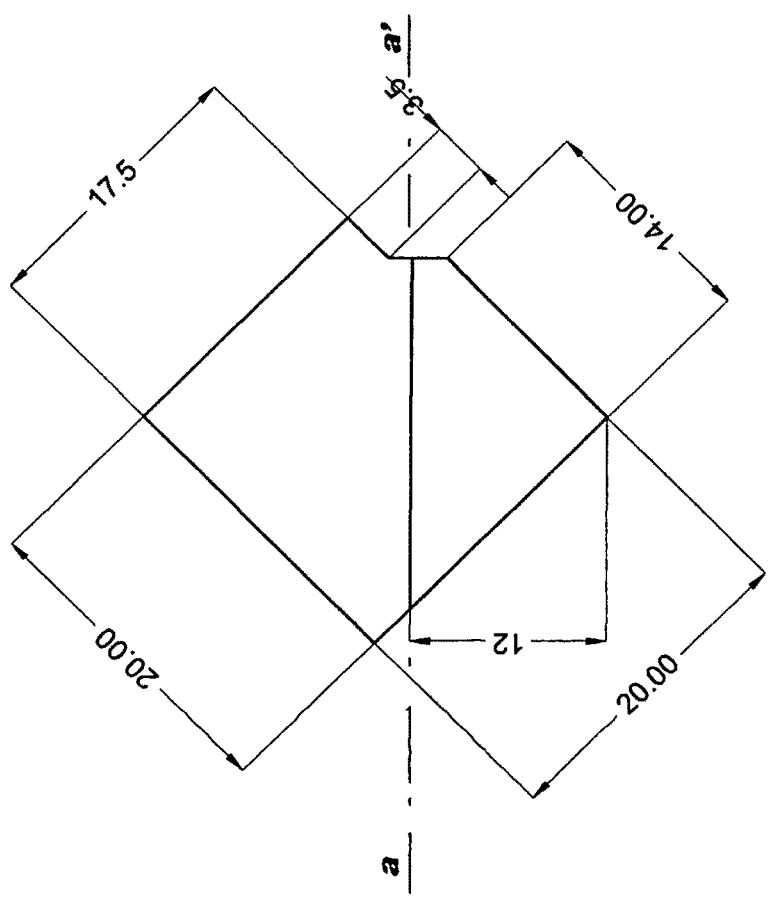

FIGS. 9A and 9B show clearly the preferred peculiar shape of the small ceramic tesserae 204, with the specification of some exemplifying measurements. In the lower half-portion the small tessera has a reduced thickness (FIG. 9B) to be able to be introduced into pocket 203a. In correspondence of one of the two aligned vertexes parallel to the axis a-a' of bar 203, a recess is provided with one side orthogonal to axis a-a' and a 45°-tilted side, i.e. parallel to the opposite side of the small tessera. This recess allows the small adjacent tesserae to partly engage one with the other (as shown in FIG. 8), increasing the mounting stability in pocket 203a.

The upper portions of small tesserae 204 are intended to project above the bars, building, with their upper vertexes, an array of resting points for the sheets being cut.

This configuration, applied to feeding tray T, is extremely advantageous. As a matter of fact, the small tesserae of refractory material are little sensitive to the reflexes of the cutting laser and have no tendency to weld to the above-lying metal sheet during the cutting phases.

Despite the intrinsic fragility of the small ceramic tesserae 204, there is no drawback thanks to the mounting mode and to the operation gentleness of the robotized hands according to the invention, which prevents harmful impacts of the metal sheet against the tessera vertexes.

Moreover, the mounting mode shown allows to easily remove and replace each tessera, in case of breakage, without nevertheless impairing support stability.

As can be easily understood from the description set forth above, the system according to the invention fully achieves the objects set forth in the introductory remarks.

Due to the flexibility of the four interchangeable-head robotized hands, the management programme may be fully optimised with no significant restriction. The control system, interfacing with the cutting programme of the cutting centre, is capable of easily and independently addressing the variability of materials, thicknesses, and types of cut pieces, which makes it a really well-suited system to be run unmanned. Should the system have to operate for several hours in a row with no assistance by an operator, it is sufficient to provide an automatic feeding system for drawing station P, which supplies, starting from automated warehouses, the sheet sequence required by the cutting programme.

Due to the presence of four robotized hands, it is possible to simultaneously transfer up to four different workpieces, or a smaller number of pieces, possibly supported and oriented simultaneously as desired by more than one robotized hand.

The interchangeability of the pick-up tool, from a simple electromagnet to a suction-cup device, allows to manage any type of sheet effortlessly. The particular embodiment of the robotized hands is moreover particularly suited and advantageous for accomplishing this interchangeability.

Finally, the peculiar arrangement of the feeding tray eliminates any problem associated with the interaction of the metal sheets with the tray during the proper cutting phase.

However, it is understood that the invention is not limited to the particular embodiments illustrated above, which represent only non-limiting examples of the scope of the invention, but that a number of variants are possible, all within the reach of a person skilled in the field, without departing from the scope of the invention.

In particular, although a system version has been shown wherein different suction-cup devices are interchangeable at the head of the robotized hand, it is not ruled out that also the terminal ferromagnetic disc of the pick-up head may be coupled with other ferromagnetic discs having different sizes and configuration.

Moreover, according to the embodiment shown, sliding crossmembers 1 and 2 are installed crosswise to the feeding tray T of the cutting centre; however, as appears evident to a person skilled in the field, it is conceivable to arrange the same system also in line to the feeding tray, suitably changing the control logic to adjust it to a different processing mode. As a matter of fact, it is evident that in the case illustrated the feeding tray of the cutting centre lies between the loading station and the unloading station, while in the other case the feeding tray would be arranged at the internal end of the handling path: therefore the sequence of movements will have to be different in the two cases.

Again, it is not ruled out that the motion of the robotized hands on the three axes may occur also with different systems from those exemplifyingly illustrated, for example with linear motors.

The invention claimed is:
1. A system for the loading/unloading of sheets, comprising:
  a feeding tray (T);
  a pair of rails (1, 2) supported at a predetermined height above the feeding tray (T);

at least two bridge cranes (3, 4) slideable on said rails (1, 2); and on each of said at least two bridge cranes (3, 4), at least one pair of Cartesian robotized hands (5-8), each pair of robotized hands being moveably mounted on a respective one of said cranes and capable of moving along horizontal axes (X,Y) and along a vertical axis (Z), each of said horizontal axes and said vertical axis being mutually orthogonal, wherein said robotized hands (5-8) have an electro-magnetic pick-up head capable of coupling with a suction-cup device (103).

2. The system as claimed in claim 1, further comprising:

a tool replacement station (S) housing a plurality of interchangeable suction-cup devices (103) for coupling with said pick-up head.

3. The system as claimed in claim 2, wherein said robotized hands each comprise an elongated prismatic body mounted translatable along said vertical axis (Z) on saddle means (104), said saddle means (104) in turn being mounted translatable along said horizontal axis (Y) on one of said bridge cranes (3, 4).

4. The system as claimed in claim 2, wherein said robotized hands (5-8) further comprise, in a lower portion thereof, a vertical-shaft electric motor, said electro-magnetic pick-up head being integral with said motor shaft.

5. The system as claimed in claim 2, wherein said feeding tray (T) comprises a plurality of parallel and equidistant bars (203) whereon a plurality of small ceramic tesserae (204) is fitted.

6. The system as claimed in claim 1, wherein said robotized hands comprise an elongated prismatic body mounted translatable along said vertical axis (Z) on saddle means (104), said saddle means (104) in turn being mounted translatable along said horizontal axis (Y) on one of said bridge cranes (3, 4).

7. The system as claimed in claim 6, wherein said robotized hands (5-8) further comprise, in a lower portion thereof, a vertical-shaft electric motor, said electro-magnetic pick-up head being integral with said motor shaft.

8. The system as claimed in claim 1, wherein said robotized hands (5-8) further comprise, in a lower portion thereof, a vertical-shaft electric motor, said electro-magnetic pick-up head being integral with said motor shaft.

9. The system as claimed in claim 8, wherein said motor shaft is hollow and said electromagnetic pick-up head has a central hole in correspondence with said motor shaft.

10. The system as claimed in claim 9, wherein said suction-cup device (103) comprises a small housing head of ferromagnetic material which supports one or more suction cups in fluid connection with a central fitting capable of arranging itself in correspondence of the central hole of said pick-up head.

11. The system as claimed in claim 9, wherein said hollow shaft is connected to a vacuum pipe.

12. The system as claimed in claim 11, wherein said vacuum pipe comprises a rotary fitting.

13. The system as claimed in claim 12, wherein said suction-cup device (103) comprises a small housing head of ferromagnetic material which supports one or more suction cups in fluid connection with a central fitting capable of arranging itself in correspondence of the central hole of said pick-up head.

14. The system as claimed in claim 11, wherein said suction-cup device (103) comprises a small housing head of ferromagnetic material which supports one or more suction cups in fluid connection with a central fitting capable of arranging itself in correspondence of the central hole of said pick-up head.

15. The system as claimed in claim 1, wherein said feeding tray (T) comprises a plurality of parallel and equidistant bars (203) whereon a plurality of small ceramic tesserae (204) is fitted.

16. The system as claimed in claim 15, wherein said ceramic tesserae (204) are substantially square-shaped, with pairs of opposite vertexes aligned and orthogonal to an axis of said bars, respectively.

17. A method or sheet handling serving a laser cutting centre, comprises the steps of:

providing a system as claimed in claim 1;

determining, based on the sheet to be transferred, if it is necessary to employ magnetic or suction-cup pick-up heads;

repeating said determining step before performing subsequent steps of transferring the robotized hands to a drawing station (P) and drawing a cut-out sheet from a feeding tray (T).

18. The method according to claim 17, further comprising:

transferring the robotized hands to a tool change centre (S) and arranging a suction-cup device on a magnetic head the pick-up head of at least one of the robotized hands, wherein both the determining step and the transferring step are repeated before performing the subsequent steps of transferring and drawing.

19. The system as claimed in claim 1, wherein said at least two bridge cranes are configured to move independently of each other along the pair of rails.

20. A system for the loading/unloading of sheets, comprising:

a feeding tray (T);

a pair of rails (1, 2) supported at a predetermined height above the feeding tray (T);

at least two bridge cranes (3, 4) slideable on said rails (1, 2); and on each of said at least two bridge cranes (3, 4), at least one pair of Cartesian robotized hands (5-8), each pair of robotized hands being moveably mounted on a respective one of said cranes and capable of moving along horizontal axes (X,Y) and along a vertical axis (Z), each of said horizontal axes and said vertical axis being mutually orthogonal, wherein said robotized hands (5-8) have an electro-magnetic pick-up head capable of coupling with a suction-cup device (103), a lower portion each pick-up head having an electro-magnet having provided therein a longitudinal channel for connection with a vacuum pipe.

21. A system for the loading/unloading of sheets, comprising:

a feeding tray (T);

a pair of rails (1, 2) supported at a predetermined height above the feeding tray (T);

at least two bridge cranes (3, 4) slideable on said rails (1, 2); and on each of said at least two bridge cranes (3, 4), at least one pair of Cartesian robotized hands (5-8), each pair of robotized hands being moveably mounted on a respective one of said cranes and capable of moving along horizontal axes (X,Y) and along a vertical axis (Z), each of said horizontal axes and said vertical axis being mutually orthogonal, wherein said robotized hands (5-8) have an electro-magnetic pick-up head capable of coupling with a suction-cup device (103), and wherein each pick-up head rotatable about a vertical axis (J) through a respective robotized hand.

\* \* \* \* \*